US007366138B2

(12) United States Patent
Uno et al.

(10) Patent No.: US 7,366,138 B2
(45) Date of Patent: Apr. 29, 2008

(54) METHOD AND SYSTEM FOR HANDOFF TO A DESTINATION BASE STATION BY MEASURING SIGNAL STRENGTH OF CARRIER SIGNALS DURING AT LEAST ONE CSMA-BACKOFF TIME

(75) Inventors: Shintaro Uno, Hachioji (JP); Ryutaro Hamasaki, Higashi-Kurume (JP)

(73) Assignee: Motorola, Inc., Schaumburg, IL (US)

( * ) Notice: Subject to any disclaimer, the term of this patent is extended or adjusted under 35 U.S.C. 154(b) by 435 days.

(21) Appl. No.: 10/546,711

(22) PCT Filed: Feb. 26, 2004

(86) PCT No.: PCT/EP2004/050215

§ 371 (c)(1),
(2), (4) Date: Aug. 22, 2005

(87) PCT Pub. No.: WO2004/077744

PCT Pub. Date: Sep. 10, 2004

(65) Prior Publication Data
US 2006/0153149 A1 Jul. 13, 2006

(30) Foreign Application Priority Data
Feb. 26, 2003 (JP) ............................... 2003-049580

(51) Int. Cl.
*H04Q 7/00* (2006.01)
(52) U.S. Cl. ........................ 370/332; 370/445; 455/436
(58) Field of Classification Search ................ 370/328, 370/329, 330, 331, 332, 445, 446, 447, 448; 455/422.1, 423, 432.1, 433, 436, 442
See application file for complete search history.

(56) References Cited

U.S. PATENT DOCUMENTS

| 6,763,007 | B1 * | 7/2004 | La Porta et al. ............ 370/331 |
| 6,947,408 | B1 * | 9/2005 | Liberti et al. ............... 370/345 |
| 2001/0024953 | A1 | 9/2001 | Balogh |
| 2002/0085516 | A1 | 7/2002 | Bridgelall |
| 2002/0123345 | A1 | 9/2002 | Schuster et al. |
| 2004/0039817 | A1 | 2/2004 | Lee et al. |

FOREIGN PATENT DOCUMENTS

| EP | 1 124 398 A | 8/2001 |
| WO | WO 01/39538 A | 5/2001 |

\* cited by examiner

*Primary Examiner*—Ricky Q. Ngo
*Assistant Examiner*—Wei-po Kao

(57) ABSTRACT

A wireless packet communication system that enables a wireless terminal to move from one wireless LAN to another while maintaining packet communication. The wireless terminal detects the electric field strength of a carrier signal from each base station during at least one back-off period, creates move destination information based on a carrier signal having the greatest electric field strength and the IP address of the currently used base station, and transmits the created Information and IP address to a server. The server writes the IP address of the wireless terminal into an edge router connected to a base station at the move destination in accordance with the information and IP address created by the wireless terminal to ensure that the packet data from a remote party is transmitted from the base station at the move destination.

6 Claims, 4 Drawing Sheets

METHOD AND SYSTEM FOR HANDOFF TO A DESTINATION BASE STATION BY MEASURING SIGNAL STRENGTH OF CARRIER SIGNALS DURING AT LEAST ONE CSMA-BACKOFF TIME

BACKGROUND OF THE INVENTION

The present invention relates to a wireless packet communication method and wireless packet communication system.

Wireless LANs have increasingly become widespread due to its convenience and gradually expanded their service areas. As a wireless LAN access technique, the CSMA/CA (Carrier Sense Multiple Access with Collision Avoidance) technique is adopted because wireless LANs cannot detect a collision.

The CSMA/CA technique waits for a predetermined period of time (this period is called a back-off period) before each wireless terminal transmits packet data to another terminal via a single access point (base station), and then performs a carrier sense operation to check whether the channel is unoccupied. If the channel is unoccupied, packet data is transmitted. After packet data transmission, a back-off process begins again. Subsequently, the same operation is performed as described above to transmit packet data with appropriate a timing for avoiding a collision with the packet data of another terminal. If the carrier sense operation finds that the channel is occupied; the back-off process begins again. Then, the carrier sense operation is performed again after the back-off process. This operating cycle is repeated until the channel is unoccupied.

Each of a plurality of wireless LANs has an independent access point (base station) within an independent service area. A plurality of terminals within the service area establish communication via the access point within the area.

The wireless LANs are independent of each other and the channel (carrier) frequencies used by their respective base stations differ from each other. The wireless LANs are separately positioned. Therefore, when another wireless LAN is to be used, communication is once cut off, and then the communication is resumed via an access point (base station) in a service area for the wireless LAN to be used.

Although the wireless LANs have been independent of each other and separately positioned, it is preferred in recent years that service areas Z61 and Z62 of new wireless LANs 61 and 62 be established among service areas Z51, Z52, and Z53 or wireless LANs 51, 52, and 53 as shown in FIG. 4 to maintain communication while a wireless terminal is moved over an extensive range (as disclosed, for instance, in Nonpatent Document 1).

[Nonpatent Document 1]
"Nikkei Internet Technology", Nikkei BP, March 2003, pages 102 through 105

However, wireless LANs 51, 52, 53, 61, and 62 are independent of each other and their associated base stations 51a, 52a, 53a, 61a, 62a use different channel (carrier signal) frequencies as described earlier. Further, the CSMA/CA technique is used as the wireless LAN access technique. Therefore, when, for instance, a wireless terminal moves from service area Z51 of wireless LAN 51 to service area Z61 of wireless LAN 61, the wireless terminal arrives in service area Z61 after passing through area Zx where service areas Z51 and Z62 overlap. In this instance, the channel frequency changes, thereby causing a problem of how to perform a carrier sense operation. When the wireless terminal is in area Z61 where the service areas overlap, a plurality of access points (two base stations 51a, 61a, in the present example) exist. Therefore, a problem arises as to how to perform a carrier sense operation and maintain communication.

The present invention has been made to solve the above problems and provides a wireless packet communication method and wireless packet communication system for sensing a carrier signal transmitted from a plurality of base stations in advance and allowing a wireless terminal to move between wireless LANs while maintaining packet communication.

SUMMARY OF THE INVENTION

One aspect of the present invention provides a wireless packet communication method in which a carrier-sense multiple access/collision avoidance (CSMA) technique is used to let a wireless terminal exchange packet data with a plurality of base stations that are respectively connected to core-net routers and different in carrier signal frequency, and the core-net routers are managed and controlled by a server. The wireless packet communication method comprises the steps of causing the wireless terminal to measure the electric field strength of each carrier signal during a back-off period, to create move destination information in accordance with the measurement result, and to transmit the created move destination information and the base station address currently used for communication to the server; and causing the server to determine a base station at the move destination for the wireless terminal in accordance with the move destination information and the base station address currently used for communication, to identify a router connected to the determined base station at the move destination, and to exercise management and control to allow the packet data addressed to the wireless terminal to be transmitted to the router from the base station at the move destination in addition to the base station currently used for communication.

Another aspect of the present invention provides a wireless packet communication method in which the electric field strength measurement of the carrier signal is made by measuring the carrier signal electric field strength of a base station other than the base station currently used for communication.

Another aspect of the present invention provides a wireless packet communication method in which the electric field strength measurement of the carrier signal is made by measuring the electric field strength of each carrier signal during a plurality of back-off periods.

Another aspect of the present invention provides a wireless packet communication method in which the move destination information is created in accordance with a carrier signal having the greatest electric field strength that has been measured.

Another aspect of the present invention provides a wireless packet communication system in which a carrier-sense multiple access/collision avoidance (CSMA) technique is used let a wireless terminal exchange packet data with a plurality of base stations that are respectively connected to core-net routers and different in carrier signal frequency, and the core-net routers are managed and controlled by a server. The wireless terminal comprises measurement means for measuring the electric field strength of the carrier signal during a back-off period, creation means for creating move destination information in accordance with the measurement result, and transmission means for transmitting the created move destination information and the base station address currently used for communication to the server before the end of the back-off period. The server determines a base station at the move destination for the wireless terminal in accordance with the move destination information and the base station address currently used for communication, identifies a router that is connected to the determined base station at the move destination, and exercises management and control to allow the packet data addressed to the wireless terminal to be transmitted to the router from the base station at the move destination in addition to the base station currently used for communication.

Still another aspect of the present invention provides a wireless packet communication system in which the measurement means measures the carrier signal electric field strength of a base station other than the base station currently used for communication.

According to one aspect of the present invention, the wireless terminal measures the electric field strength of a carrier signal during a back-off period, creates move destination information in accordance with the measurement result, and transmits the created move destination information and the base station address currently used for communication to the server. The server determines a base station at the move destination for the wireless terminal in accordance with the move destination information and the base station address currently used for communication, identifies a router that is connected to the determined base station at the move destination, and exercises management and control to allow the packet data addressed to the wireless terminal to be transmitted to the router from base station at the move destination in addition to the base station currently used for communication. As a result, the wireless terminal can move between wireless LANs while maintaining packet communication.

According to another aspect of the present invention, the electric field strength measurement of the carrier signal is made by measuring the carrier signal electric field strength of a base station other than the base station currently used for communication, and then generating the move destination information.

According to another aspect of the present invention, the electric field strength measurement of the carrier signal is made by measuring the electric field strength of each carrier signal during a plurality of back-off periods. Therefore, the move destination information is transmitted subsequently to a plurality of back-off periods.

According to another aspect of the present invention, the move destination information is created in accordance with a carrier signal having the greatest electric field strength that has been measured. Therefore, the packet data addressed to the wireless terminal is transmitted from a base station that generates a carrier signal having the greatest electric field strength.

When, according to another aspect of the present invention, measurement means measures the electric field strength of a base station carrier signal during a back-off period, creation means creates move destination information in accordance with the measurement result. Transmission means then transmits the created move destination information and the base station address currently used for communication to the server before the end of the back-off period. The server determines a base station at the move destination for the wireless terminal in accordance with the move destination information and the base station address currently used for communication identifies a router that is connected to the determined base station at the move destination, and allows the packet data addressed to the wireless terminal to be transmitted to the router from the base station at the move destination in addition to the base station currently used for communication. As a result, the wireless terminal can move between wireless LANs while maintaining communication.

According to still another aspect of the present invention, the measurement means measures the carrier signal electric field strength of a base station other than the base station currently used for communication, and the creation means creates the move destination information in accordance with the measurement result.

DETAILED DESCRIPTION OF THE PREFERRED EMBODIMENTS

Figure 1:
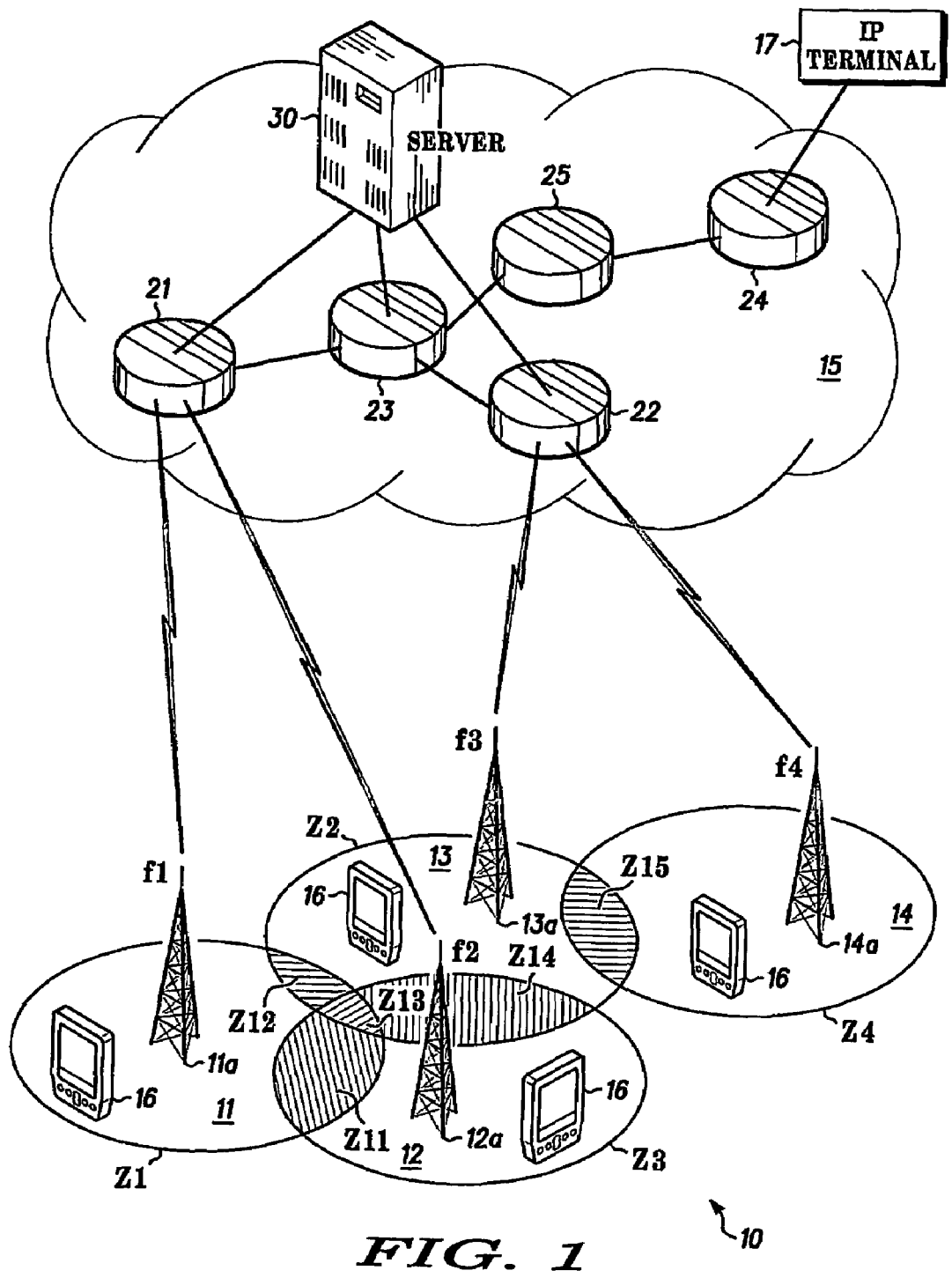
FIG. 1 is a block diagram illustrating the configuration of one embodiment of a network according to the present invention.

One embodiment of the present invention will now be described with reference to the accompanying drawings. FIG. 1 illustrates the configuration of a network according to the present invention.

As sown in FIG. 1, the network 10 comprises a core network 15 and wireless terminals 16. The core network 15 comprises first to fourth wireless LANs 11-14 and the Internet, which interconnects the wireless LANs 11-14. The first to fourth LANs 11-14 have first to fourth base stations 11a-14a as their respective access points. Areas covered by the carrier signals transmitted from the base stations 11a-14a are referred to as first to fourth service areas Z1-Z4. As shown in FIG. 1, the first to fourth service areas Z1-Z4 are configured so that they overlap with their neighboring service area.

The overlap between the first service area Z1 and second service area Z2 is referred to as a first overlapped communication area Z11. The overlap between the first service area Z1 and third service area Z3 is referred to as a second overlapped communication area Z12. The overlap of the first to third service areas Z1-Z3 is referred to as a third overlapped communication area Z13. The overlap between the second service area Z2 and third service area Z3 is referred to as a fourth overlapped communication area Z14. The overlap between the third service area Z3 and fourth service area Z4 is referred to as a fifth overlapped communication area Z15.

In the present embodiment, the frequencies f1-f4 of the carrier signals transmitted from the base stations 11a-14a differ from each other. Therefore, two different carrier signals having frequencies f1 and f2 exist in the first overlapped communication area Z11. In the second overlapped communication area Z12, two different carrier signals having frequencies f1 and f3 exist. In the third overlapped communication area Z13, three different carrier signals having frequencies f1, f2, and f3 exist. In the fourth overlapped communication area Z14, two different carrier signals having frequencies f2 and f3 exist. In the fifth overlapped communication area Z15, two different carrier signals having frequencies f3 and f4 exist.

The wireless LANs 11-14 are connected to the core network 15. The first and second base stations 11a, 12a of the first and second wireless LANs 11, 12 are connected to a first edge router 21 of the core network 15. The second and third base stations 12a, 13a of the second and third wireless LANs 13, 14 are connected to a second edge router 22 of the core network 15. The first and second edge router 21, 22 are connected to their common core router 23. The core network 15 is provided with a server 30, which manages and controls the first and second edge routers 21, 22, the core router 23, another edge router 24, and another core router 25.

The wireless terminals 16 can establish packet communication with another wireless terminal 16 within the currently used first to fourth wireless LANs 11-14 and still another wireless terminal 16 within the other first to fourth wireless LANs 11-14, and establish packet communication with an IP terminal 17 via the core network 15.

Figure 2:
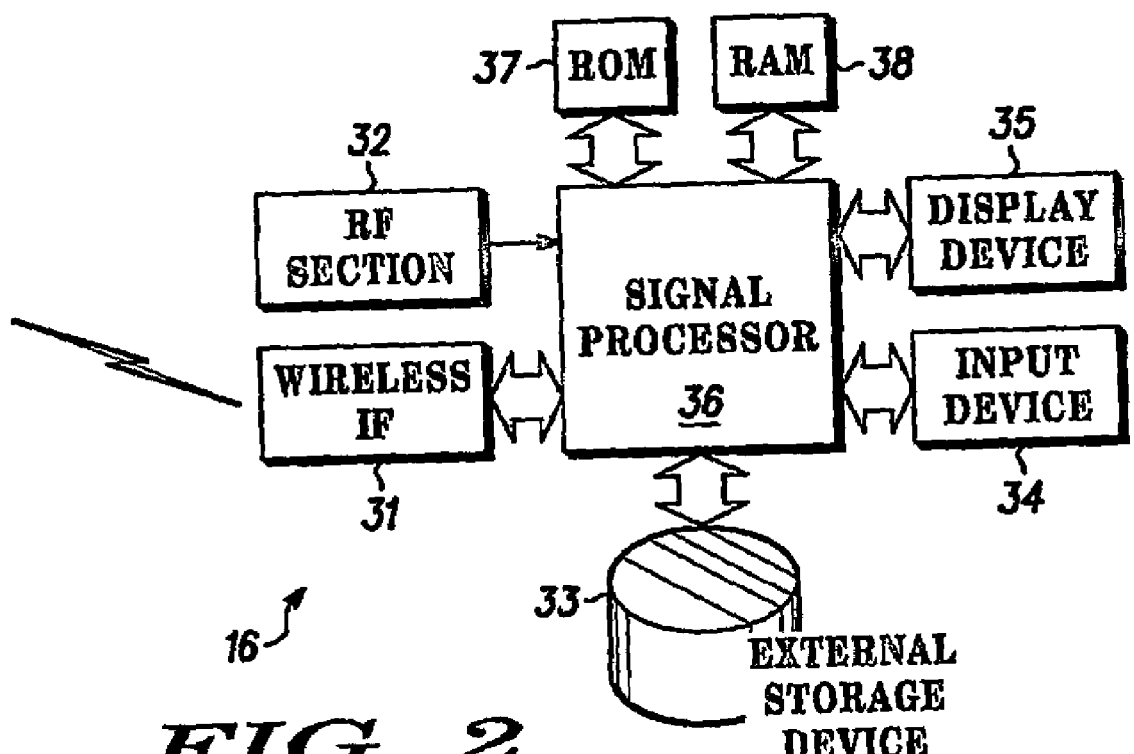
FIG. 2 is a block circuit diagram illustrating the electrical configuration of a wireless terminal.

FIG. 2 is a block circuit diagram illustrating the electrical configuration of a wireless terminal 16. As shown in FIG. 2, the wireless terminal 16 comprises a wireless interface 31, an RF section 32, an external storage device 33, an input device 34, a display device 35, a signal processor 36, a ROM 37, and RAM 38. The wireless interface 31 receives packet data from another wireless terminal 16 or IP terminal 17 via the base stations 11a-14a of the first to fourth wireless LANs 11-14, transmits packet data generated by the signal processor 36 to the base stations 11a-14a to forward it to another wireless terminal 16 or IP terminal 17. Further, the wireless interface 31 receives a carrier signal that is transmitted from the base stations 11a-14a in order to detect the carrier signal electric field strength, and outputs the received carrier signal to the signal processor 36.

The RF section 32 includes a local oscillator and generates local oscillation signals, which have the same frequencies as carrier signals that are transmitted from the base stations 11a-14a of the first to fourth wireless LANs 11-14 and have frequencies f1, f2, f3, and f4.

The external storage device 33 stores various application programs for media communications of voice, video, message applications, and the like. The input device 34 includes operating control switches for exercising various communication functions. In accordance with the operations of the operating control switches, an operating control signal is output to the signal processor 36. The display device 35 includes an LCD, and displays text, still pictures, motion pictures, and other information in accordance with the image signal input from the signal processor 36.

The signal processor 36, which provides measurement means, creation means, and transmission means, includes a microcomputer, performs various signal processes for packet communication in accordance with a control program stored in the ROM 37, and temporarily stores the results of computations for individual signal processes in the RAM 38.

The signal processor 36 creates packet data to be transferred to another wireless terminal 16 or IP terminal 17 in accordance with the operations of the operating control switches on the input device 34, and transmits the created packet data to the first to fourth base stations 11a-14a via the wireless interface 31. Before transmitting the packet data to the first to fourth base stations 11a-14a and after the elapse of a predetermined back-off period, the signal processor 36 performs a carrier sense operation to check whether the channel is unoccupied. If the channel is unoccupied, the signal processor 36 performs a process for transmitting the packet data. The signal process performed by the signal processor 36 is based on the so-called CSMA/CA technique.

During the back-off period, the signal processor 36 measures the electric field strength of a carrier signal that is transmitted from a base station other than the base station for the wireless LAN currently used for communication. The signal processor 36 inputs a local oscillation signal having the same frequency as the carrier signal frequency (f1-f4) that is transmitted from a base station other than the base station for the wireless LAN currently used for communication, and inputs a carrier signal that is input via the wireless interface 31. In accordance with the local oscillation signal and carrier signal, the signal processor 36 then extracts only the carrier signal transmitted from a target base station and determines the electric field strength of the extracted carrier signal.

If, for instance, a wireless terminal 16 has established communication with the first wireless LAN 11 as shown in FIG. 1, the wireless terminal 16 determines, during a back-off period, the electric field strengths of carrier signals that are transmitted from the base stations 12a-14a of the second to fourth wireless LANs 12-14 and have different frequencies (f2, f3, and f4). If the wireless terminal 16 had established communication with the second wireless LAN 12, the wireless terminal 16 determines, during the back-off period, the electric field strength of carrier signals that are transmitted from the base stations 11a, 13a, 14a of the first, third, and fourth wireless LANs 11, 13, 14 and have different frequencies (f1, f3, and f4). If the wireless terminal 16 has established communication with the third wireless LAN 13, the wireless terminal 16 determines, during the back-off period, the electric field strengths of carrier signals that are transmitted from the base stations 11a, 12a, 14a of the first, second, and fourth wireless LANs 11, 12, 14 and have different frequencies (f1, f2, and f4). If the wireless terminal 16 has established communication with the fourth wireless LAN 14, the wireless terminal 16 determines, during the back-off period, the electric field strengths of carrier signals that are transmitted from the base stations 11a-13a of the first to third wireless LANs 11-13 and have different frequencies (f1-f3).

After the electric field strengths of the carrier signals are obtained, the signal processor 36 determines a barrier signal having the greatest electric field strength, and generates the information about the carrier signal having the greatest electric field strength (move destination information. The signal processor 36 then transmits the move destination information, the IP address of the base station currently used for communication, and the IP address of the wireless terminal 16 to the server 30 within the core network 15. The signal processor 36 completes a series of processing operations for transmitting the move destination information, the IP address of the base station, and the IP address of the wireless terminal 16 to the server 30 by the end of the back-off period.

Immediately after the back-off period is ended, the signal processor 36 inputs from the RF section 32 a local oscillation signal having the same frequency as the carrier signal that is transmitted from the base station for the wireless LAN currently used for communication. In other words, the local oscillation signal from the RF section 32 reverts to the frequency prevailing before the back-off period in order for the signal processor 36 to perform the next carrier sense operation, packet transmission operation, packet reception operation, and other operations.

When the move destination information, the IP address of the base station, and the IP address of the wireless terminal 16 are entered, the server 30 searches a database included in the server 30 for the move destination for the wireless terminal 16 (handover destination) in accordance with the move destination information and base station IP address. If, for instance, the base station IP address indicates the first base station 11*a* and the move destination information indicates that the carrier signal transmitted from the second base station 12*a* has the greatest electric field strength, the server 30 concludes that the wireless terminal 16 is moving from the first base station 11*a* (first wireless LAN 11), to the second base station 12*a* (second wireless LAN 12). More specifically the server 30 concludes that has reached the first overlapped communication area Z11 and is moving toward the second wireless LAN 12 (second base station 12*a*).

After the move destination base station is determined, the server 30 identifies an edge router that is connected to the move destination base station, and copies to the edge router the information (wireless terminal IP address) for entering that the packet data to be transmitted to the wireless terminal 16 will be transmitted to the base station as well.

In other words, when the wireless terminal 16 is moving from the first base station 11*a* to the second base station 12*a*, the server 30 copies the information (wireless terminal IP address) for transmitting the outgoing packet data to the second base station 12*a* in addition to the first base station 11*a* to the first edge router 21, which is to be connected to the second base station 12*a*. Consequently, the packet data transmitted from a remote location in response to the packet data transmitted from the wireless terminal 16 is transmitted not only from the first base station 11*a* to the first service area Z1 but also from the second base station 12*a* to the second service area Z2.

When the wireless terminal 16 is moving from the first base station 11*a* to the third base station 13*a*, the third base station 13*a* is connected to the second edge router 22, which is different from the first edge router 21 for the first base station 11*a*. In this instance, the server 30 copies to the second edge router the information (wireless terminal IP address) for ensuring that the packet data to be transmitted to the wireless terminal 16 will also be transmitted to the third base station 13*a*. Further, the server 30 copies to the core router 23 common to the first and second edge routers 21, 22 the information (IP address of the second edge routers 21) for ensuring that the packet data to be transmitted to the wireless terminal 16 is transmitted to the second edge router 22 as well as the first edge router 21.

Figure 3:
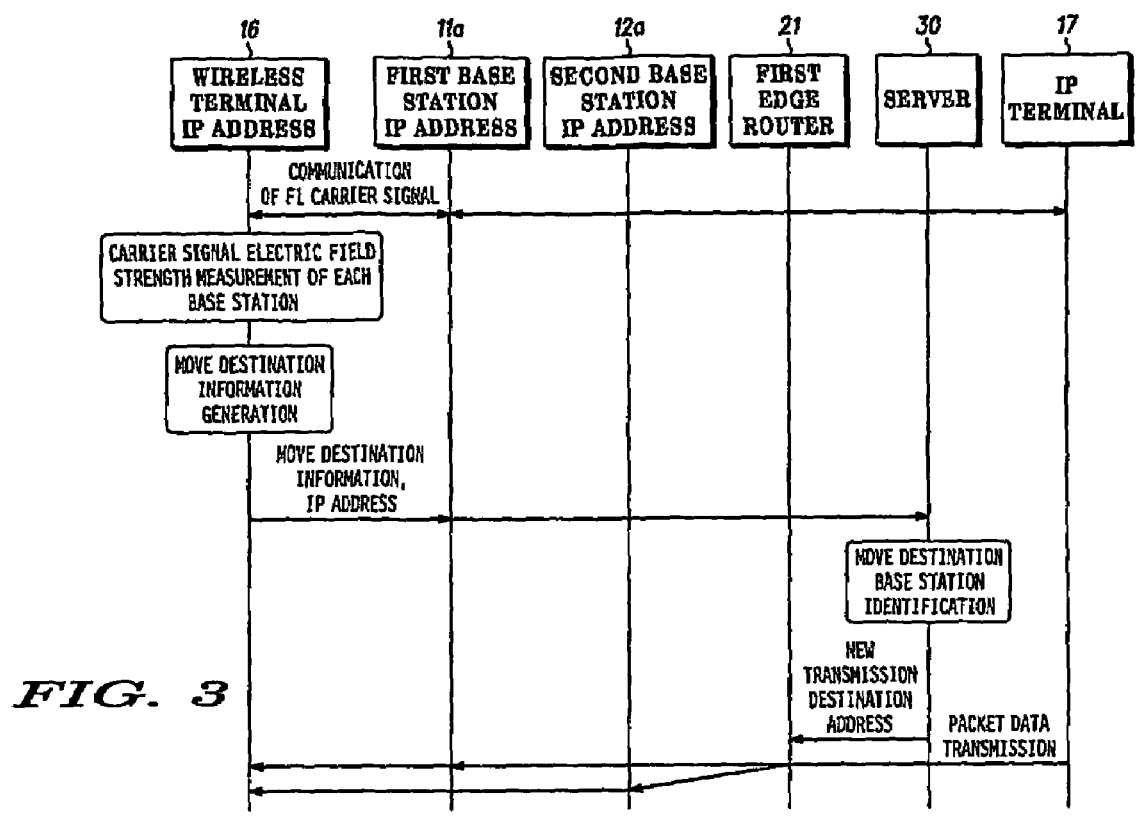
FIG. 3 is a sequence chart illustrating how a wireless terminal moves from one base station to another.
Figure 4:
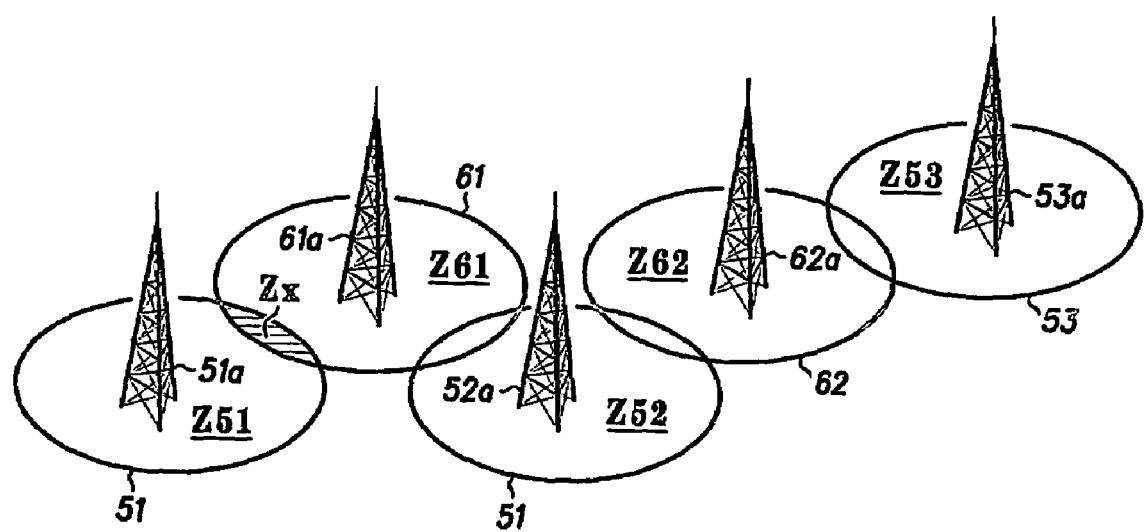
FIG. 4 is a block diagram illustrating the configuration of a conventional network.

The operation performed by the wireless LAN packet communication system, which is configured as explained above, will now be described with reference to FIG. 3. When the wireless terminal 16 uses the first wireless LAN 11 to communicate with the IP terminal 17 via the core network 15, the path for packet data transfer from the wireless terminal 16 to the IP terminal 17 is from the first base station 11*a* through the first edge router 21, core router 23 core router 25, edge router 24 to the IP terminal 17. The path for packet data transfer from the IP terminal 17 to the wireless terminal 16 is from the edge router 24 through core router 25, core router 23, first edge router 21, first base station 11*a* to the wireless terminal 16.

In the above instance, the data to be transmitted to the first base station 11*a* is written in the first edge router 21 as the packet data from the IP terminal 17 to the wireless terminal 16. In core router 23, the data to be transmitted to the first edge router 21 is written as the packet data from the IP terminal 17 to the wireless terminal 16.

In the above state, the wireless terminal 16 changes the local oscillation signal frequency of the RF section 32 during each back-off period, and determines the electric field strengths of carrier signals that are generated from the second to fourth base stations 12*a*-14*a* and have different frequencies (f2, f3, and f4). Since, in this instance, the wireless terminal 16 is outside the service areas Z2-Z4 of the second to fourth base stations 12*a*-14*a*, the electric field strength is zero. Consequently the signal processor 36 concludes that the wireless terminal 16 is moving in the first service area Z1, and informs the server 30 of such a conclusion. The server 30 establishes communication between the wireless terminal 16 and IP terminal 17 without doing anything to the first edge router 21 or core router 23.

When the wireless terminal 16 moves from the first base station 11*a* to the second base station 12*a* and reaches the first overlapped communication area Z11, the signal processor 36 for the wireless terminal 16 determines that the carrier signal generated from the second base station 12*a* has the greatest electric field strength. The signal processor 36 then transmits the move destination information, the IP address of the first base station 11*a*, and the IP address of the wireless terminal 16 to the server 30 within the core network 15.

The server 30 searches the database for the move destination (handover destination for the wireless terminal 16 in accordance with the move destination information and the IP address of the first base station 13*a*, and concludes that the wireless terminal 16 is in the first overlapped communication area Z11 and moving toward the second base station 12*a*.

When the second base station 12*a* at the move destination is determined, the server 30 determines that the second base station 12*a* is connected to the first edge router 21, and copies the IP address of the wireless terminal 16 to the first edge router 21 to ensure that the packet data to be transmitted from the IP terminal 17 to the wireless terminal 16 will also be transmitted to the second base station 12*a*.

Consequently, the packet data to be transmitted from the IP terminal 17 to the wireless terminal 16 will also be transmitted from the first base station 11*a* and second base station 12*a*. In other words, even if the wireless terminal 16 moves from the first base station 11*a* to the second base station 12*a*, the packet data from the IP terminal 17 is transmitted beforehand to the wireless terminal 16 from the second base station 12*a* as well as the first base station 11*a* at the time when the wireless terminal 16 is in the first overlapped communication area Z11. As a result, the wireless terminal 16 can move from one base station to another without disrupting communication.

The features of the embodiment that has been described above will now be explained. (1) In the present embodiment described above, the signal processor 36 for the wireless terminal 16 detects the electric field strengths of the barrier signals transmitted from the base stations 11*a*-14*a* during a back-off period, creates the move destination information in accordance with the carrier signal having the greatest electric field strength, the IP address of the currently used base station, and the IP address of the wireless terminal 16, and transmits the created information and IP addresses to the server 30.

The server 30 writes an IP address into, for instance, edge routers 21 and 22, which are connected to a base station at the move destination so that the packet data from a remote party is transmitted from a base station at the move destination in accordance with the information and IP address created by the signal processor 36.

Therefore, the wireless terminal 16 can move from the current base station to another base station while maintaining packet communication with the remote party. (2) In the present embodiment described above, back-off period is used to detect the electric field strengths of carrier signals of the base stations 11a-14a and transmit the destination information and the IP addresses of the wireless terminal 16 and the like to the server 30. Therefore, the signal processor 36 processes signals for packet communication without being significantly interrupted.

(3) In the present embodiment described above, the wireless terminal 16 determines a carrier signal that has the greatest electric field strength. Therefore, the load on the server 30 is reduced. The embodiment of the present invention may be altered as described below.

In the present embodiment described above, carrier signal electric field detection is accomplished in such a manner as to detect the carrier signal electric field strengths of all base stations other than the currently used base stations during a single back-off period. Alternately, however, the carrier signal electric field strengths of all base stations other than the currently used base station may be detected during a plurality of back-off periods. In this alternative embodiment, the move destination information is obtained by determining a carrier signal having the greatest electric field strength after detection of all the carrier signals.

In the present embodiment described above, carrier signal electric field strength detection is accomplished so as to create the move destination information from the carrier signal electric field strengths of all base stations other than the currently used base station. Alternative, however, the move destination information may be created in accordance with a carrier signal having the greatest electric field strength that is determined by comparing the carrier signals of all base stations including the base station currently used for communication. If the carrier signal of the base station currently used for communication has the greatest electric field strength in this alternative embodiment, the server 30 does not write a new IP address into routers 21 and 22.

In the present embodiment described above, the carrier signals of all base stations other than the currently used base station are examined to select a carrier signal having the greatest electric field strength. Alternatively, however, carrier signals having an electric field strength greater than prescribed may be examined to select a carrier signal having the greatest electric field strength, two or more carrier signals having relatively great electric field strengths; or all the carrier signals having an electric field strength greater than prescribed. If, in this alternative embodiment, the electric field strengths of all the carrier signals are smaller than prescribed, the carrier signal electric field strength is considered to be zero as is the case with the present embodiment. Further, if two or more carrier signals are selected and transmitted to the server 30 as the move destination information, the server 30 writes a new IP address into routers 21 and 22 to ensure that target base stations transmit packet data. If, for instance, the wireless terminal 16 is positioned in the third overlapped communication area Z13 as shown in FIG. 1, the first to third base stations 11a-13a transmit packet data.

As described above, the present invention enables a wireless terminal to move from one wireless LAN to another while maintaining packet communication.

The invention claimed is:

1. A wireless packet communication method in which a carrier-sense multiple access/collision avoidance (CSMA) technique is used to let a wireless terminal exchange packet data with a plurality of base stations that are respectively connected to core-net routers and different in carrier signal frequency, and said core-net routers are managed and controlled by a server, said method comprising the steps of:
   causing said wireless terminal to measure the electric field strength of each carrier signal during a back-off period, to create move destination information in accordance with the measurement result, and to transmit the created move destination information and the base station address currently used for communication to said server; and
   causing said server to determine a base station at the move destination for said wireless terminal in accordance with said move destination information and the base station address currently used for communication, to identify a router connected to the determined base station at the move destination, and to exercise management and control to allow the packet data addressed to said wireless terminal to be transmitted to the router from said base station at the move destination in addition to the base station currently used for communication.

2. The wireless packet communication method according to claim 1, wherein the electric field strength measurement of said carrier signal is made by measuring the carrier signal electric field strength of a base station other than the base station currently used for communication.

3. The wireless packet communication method according to claim 1, wherein the electric field strength measurement of said carrier signal is made by measuring the electric field strength of each carrier signal during a plurality of back-off periods.

4. The wireless packet communication method according to claim 1, wherein said move destination information is created in accordance with a carrier signal having the greatest electric field strength that has been measured.

5. A wireless packet communication system in which a carrier-sense multiple access/collision avoidance (CSMA) technique is used let a wireless terminal exchange packet data with a plurality of base stations that are respectively connected to core-net routers and different in carrier signal frequency, and said core-net routers are managed and controlled by a server, wherein said wireless terminal comprises measurement means for measuring the electric field strength of said carrier signal during a back-off period, creation means for creating move destination information in accordance with the measurement result, and transmission means for transmitting the created move destination information and the base station address currently used for communication to said server before the end of the back-off period, and wherein said server determines a base station at the move destination for said wireless terminal in accordance with said move destination information and the base station address currently used for communication, identifies a router connected to the determined base station at the move destination, and exercises management and control to allow the packet data addressed to said wireless terminal to be transmitted to the router from said base station at the move destination in addition to the base station currently used for communication.

6. The wireless packet communication system according to claim 5, wherein said measurement means measures the carrier signal electric field strength of a base station other than the base station currently used for communication.

* * * * *

UNITED STATES PATENT AND TRADEMARK OFFICE
CERTIFICATE OF CORRECTION

| | |
|---|---|
| PATENT NO. | : 7,366,138 B2 |
| APPLICATION NO. | : 10/546711 |
| DATED | : April 29, 2008 |
| INVENTOR(S) | : Uno et al. |

It is certified that error appears in the above-identified patent and that said Letters Patent is hereby corrected as shown below:

Title Page, Item (75), under "Inventors", in Column 1, Line 1, delete "Hachioji (JP);" and insert -- Tokyo, (JP); --, therefor.

Title Page, Item (75), under "Inventors", in Column 1, Line 2, delete "Higashi-Kurume (JP)" and insert -- Tokyo, (JP) --, therefor.

In Column 1, Line 27, after "appropriate" delete "a".

In Column 1, Line 29, after "occupied" delete ";" and insert -- , --, therefor.

In Column 1, Line 48, delete "Z53 or" and insert -- Z53 of --, therefor.

In Column 2, Line 1, after "61a" delete ",".

In Column 3, Line 65, after "communication" insert -- , --, therefor.

In Column 4, Line 32, delete "sown" and insert -- shown --, therefor.

In Column 4, Line 42, delete "area" and insert -- areas --, therefor.

In Column 5, Line 7, delete "router" and insert -- routers --, therefor.

In Column 5, Line 23, before "RAM" insert -- a --, therefor.

In Column 6, Line 21, delete "had" and insert -- has --, therefor.

In Column 6, Line 24, delete "strength" and insert -- strengths --, therefor.

In Column 6, Line 41, delete "barrier" and insert -- carrier --, therefor.

In Column 6, Line 44, after "information" insert -- ) --, therefor.

In Column 7, Line 8, after "11)" delete ",".

In Column 7, Line 10, after "specifically" insert -- , --.

In Column 7, Line 16, delete "entering" and insert -- ensuring --, therefor.

In Column 7, Line 40, delete "routers" and insert -- router --, therefor.

In Column 7, Line 52, after "23" insert -- , --.

In Column 8, Line 5, after "Consequently" insert -- , --.

In Column 8, Line 21, delete "destination" and insert -- destination) --, therefor.

In Column 8, Line 23, delete "13a," and insert -- 11a, --, therefor.

UNITED STATES PATENT AND TRADEMARK OFFICE
CERTIFICATE OF CORRECTION

PATENT NO. : 7,366,138 B2
APPLICATION NO. : 10/546711
DATED : April 29, 2008
INVENTOR(S) : Uno et al.

It is certified that error appears in the above-identified patent and that said Letters Patent is hereby corrected as shown below:

In Column 8, Line 49, delete "barrier" and insert -- carrier --, therefor.

In Column 9, Line 1, after "transmit the" insert -- move --.

In Column 9, Line 12, after "electric field" insert -- strength --.

In Column 9, Line 14, delete "stations" and insert -- station --, therefor.

In Column 9, Line 15, delete "Alternately" and insert -- Alternatively --, therefor.

In Column 9, Line 26, delete "Alternative" and insert -- Alternatively --, therefor.

In Column 9, Line 42, delete "strengths;" and insert -- strengths, --, therefor.

Signed and Sealed this

Eighteenth Day of August, 2009

David J. Kappos
*Director of the United States Patent and Trademark Office*